(12) United States Patent
Zhao et al.

(10) Patent No.: US 11,114,103 B2
(45) Date of Patent: Sep. 7, 2021

(54) SYSTEMS, METHODS, AND COMPUTER-READABLE STORAGE MEDIA FOR AUDIO SIGNAL PROCESSING

(71) Applicant: Alibaba Group Holding Limited, Grand Cayman (KY)

(72) Inventors: Yan Zhao, Columbus, OH (US); Gang Liu, Bellevue, WA (US); Yun Lei, San Francisco, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 188 days.

(21) Appl. No.: 16/236,208

(22) Filed: Dec. 28, 2018

(65) Prior Publication Data

US 2020/0211569 A1 Jul. 2, 2020

(51) Int. Cl.
| | | |
|---|---|---|
| *G10L 17/02* | (2013.01) | |
| *G10L 17/18* | (2013.01) | |
| *G10L 25/84* | (2013.01) | |
| *G10L 17/00* | (2013.01) | |

(52) U.S. Cl.
CPC .............. *G10L 17/02* (2013.01); *G10L 17/00* (2013.01); *G10L 17/18* (2013.01); *G10L 25/84* (2013.01)

(58) Field of Classification Search
None
See application file for complete search history.

(56) References Cited

U.S. PATENT DOCUMENTS

| | | | |
|---|---|---|---|
| 5,461,697 A | 10/1995 | Nishimura et al. | |
| 5,839,103 A | 11/1998 | Mammone et al. | |
| 6,922,668 B1 | 7/2005 | Downey | |
| 9,502,038 B2 | 11/2016 | Wang et al. | |
| 9,858,919 B2 | 1/2018 | Saon | |
| 10,008,209 B1 | 6/2018 | Qian et al. | |
| 10,347,256 B2 | 7/2019 | Khoury et al. | |
| 10,381,009 B2 | 8/2019 | Khoury et al. | |
| 2016/0293167 A1 | 10/2016 | Chen et al. | |
| 2017/0125020 A1* | 5/2017 | Seo | G10L 15/144 |
| 2018/0006837 A1* | 1/2018 | Cartwright | H04M 3/568 |
| 2019/0156837 A1 | 5/2019 | Park et al. | |

(Continued)

FOREIGN PATENT DOCUMENTS

| | | |
|---|---|---|
| CN | 106920544 A | 7/2017 |
| CN | 107680597 A | 2/2018 |

(Continued)

OTHER PUBLICATIONS

Translation of Chinese International Search Report dated Mar. 25, 2020, from corresponding Chinese PCT Application No. PCT/CN2019/127397, 3 pages.

(Continued)

*Primary Examiner* — Antim G Shah

(74) *Attorney, Agent, or Firm* — Lee & Hayes, P.C.

(57) ABSTRACT

Systems and methods are provided for improving audio signal processing by receiving an audio signal; obtaining a plurality of multi-dimensional features based on the audio signal; obtaining a plurality of segment-level representations based on the plurality of multi-dimensional features; obtaining an utterance-level representation based on the plurality of segment-level representations; and recognizing a speaker from the audio signal based on the utterance-level representation.

13 Claims, 9 Drawing Sheets

(56) References Cited

U.S. PATENT DOCUMENTS

| | | | |
|---|---|---|---|
| 2019/0251439 A1* | 8/2019 | Zoph | G06N 3/08 |
| 2019/0304470 A1* | 10/2019 | Ghaemmaghami | G10L 17/06 |
| 2019/0341057 A1 | 11/2019 | Zhang et al. | |
| 2019/0341058 A1 | 11/2019 | Zhang et al. | |
| 2019/0355366 A1 | 11/2019 | Ng et al. | |
| 2020/0019610 A1* | 1/2020 | Agarwal | G06F 40/30 |
| 2020/0090651 A1* | 3/2020 | Tran | G10L 15/16 |

FOREIGN PATENT DOCUMENTS

| | | |
|---|---|---|
| CN | 17845390 A | 3/2018 |
| WO | WO2014114116 A1 | 7/2014 |

OTHER PUBLICATIONS

Translation of Chinese Written Opinion dated Mar. 25, 2020, from corresponding Chinese PCT Application No. PCT/CN2019/127397, 3 pages.

Peng, Zhichao, "Speech Emotion Recognition Using Multichannel Parallel Convolutional Recurrent Neural Networks based on Gammatone Auditory Filterbank", Proceedings of APSIPA Annual Summit and Confeence 2017, Dec. 15, 2017 (Dec. 15, 2017), pp. 1750-1754.

\* cited by examiner

| Layer | Kernel size | Stride | Padding | No. of filters | Data size (1×64×10) |
|---|---|---|---|---|---|
| Conv1 | 3×3 | (1,1) | 1 | 256 | (128×64×10) |
| Maxpool1 | 2×2 | (2,2) | 0 | - | (128×32×5) |
| Conv2 | 3×3 | (2,2) | 1 | 256 | (256×16×3) |
| Maxpool2 | 2×3 | (2,1) | 0 | - | (256×8×1) |
| Conv3 | 1×1 | (1,1) | 0 | 64 | (64×8×1) |

FIG. 2

|  | Layer | Kernel size | Stride | Padding | No. of filters (in) | No. of filters (out) |
|---|---|---|---|---|---|---|
| Block 1 | Conv1×1 | 1×1 | 2 | 0 | N | M |
| Block 2 | Conv1×1 | 1×1 | 1 | 0 | N | M/2 |
|  | Conv3×3 | 3×3 | 2 | 1 | M/2 | M |
| Block 3 | Conv1×1 | 1×1 | 1 | 0 | N | M/2 |
|  | Conv3×3 | 3×3 | 1 | 1 | M/2 | M |
|  | Conv3×3 | 3×3 | 2 | 1 | M | M |
| Block 4 | Maxpool3×3 | 3×3 | 2 | 1 | N | N |
|  | Conv1×1 | 1×1 | 1 | 0 | N | M |

| Layer | N | M | Data size (1×64×10) |
|---|---|---|---|
| Block 1 | 1 | 64 | 256×32×32 |
| Block 2 | 256 | 64 | 256×16×16 |
| Block 3 | 256 | 128 | 512×8×8 |
| Block 4 | 512 | 128 | 512×4×4 |
| Maxpool (4×4) | - | - | 512×1×1 |

SYSTEMS, METHODS, AND COMPUTER-READABLE STORAGE MEDIA FOR AUDIO SIGNAL PROCESSING

BACKGROUND

In a harsh acoustic environment, where there is interference of ambient noise, background voice, equipment noise, room reverberation, etc., the speaker recognition may be difficult to achieve.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates a table of an example configuration of Convolutional Neural Network (CNN).

FIG. 4 illustrates a table of an example configuration of the inception block-based CNN.

FIG. 5 illustrates a table of parameters of layers/blocks of the inception block-based CNN.

DETAILED DESCRIPTION

Systems and methods discussed herein are directed to improving audio signal processing, and more specifically to improving speaker recognition.

Terminologies in the specification may be denoted as follows. Speaker embedding/representation refers to a vector that characterizes speaker information learned from large-scale speech data by a machine learning system. Text-independent speaker recognition refers to the speaker recognition that does not depend on specific speech content. Text-dependent speaker recognition refers to the speaker recognition that defines the required content. CNN refers to a type of feedforward neural network, which is widely applied in image/speech recognition and video analysis. Recurrent Neural Network (RNN) refers to a type of neural network, which is used to describe dynamic time behavior and model time series information.

Figure 1:
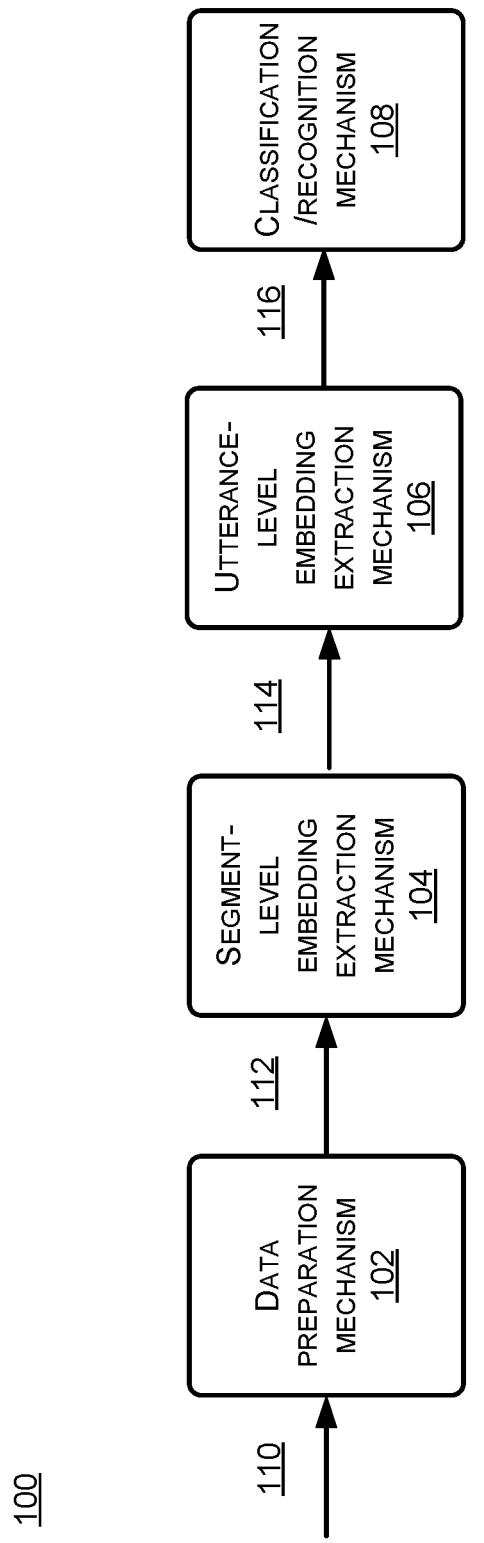
FIG. 1 illustrates an example block diagram of a system for audio signal processing.

FIG. 1 illustrates an example block diagram of a system 100 for audio signal processing.

The system 100 may include a data preparation mechanism 102, a segment-level embedding extraction mechanism 104, an utterance-level embedding extraction mechanism 106, and a classification/recognition mechanism 108.

The data preparation mechanism 102 may receive an audio/speech signal 110, which may be a time-domain signal in the form of utterances/sentences. In spoken language analysis, an utterance is the smallest unit of speech. The audio/speech signal 110 may be obtained from a dataset or real recordings, where different speakers may speak in various environments with noise interference.

The data preparation mechanism 102 may frame the audio/speech signal 110 with a predetermined window size and a predetermined window shift to obtain a sequence of frames. As an example, the predetermined window size may be 25 ms, and the predetermined window shift may be 10 ms. The predetermined window size and the predetermined window shift may be adjusted as necessary and is not limited thereto.

The data preparation mechanism 102 may group the frames of the audio/speech signal 110 into a sequence of segments with each segment having a predetermined length. The predetermined length of the segment, i.e., a predetermined number of frames, may be adjusted as necessary. For example, the predetermined length may be 10 frames, 64 frames, etc. There may be overlap or no overlap between adjacent segments, and a tail portion of the audio/speech signal 110, which has a length smaller than the predetermined length, may be discarded.

The data preparation mechanism 102 may obtain a multi-dimensional feature based on each frame of the audio/speech signal 110. For example, a filter bank (not shown) may be used to convert the sequence of frames of the audio/speech signal 110 into a sequence of multi-dimensional features. The multi-dimensional feature may be, but not limited to, a 64-dimensional (64-D) vector. For a segment, multi-dimensional features may also be obtained. For example, if a segment included 10 frames, the multi-dimensional features of the segment would be a 64×10 matrix. If a segment included 64 frames, the multi-dimensional features of the segment would be a 64×64 matrix.

The definitions of vector and matrix in the context are plain mathematical definitions. A vector of dimension n is an ordered collection of elements, which are also called components, where n is a positive integer. A matrix is an array of numbers, symbols, or expressions, arranged in rows and columns. The audio/speech signal 110 may be viewed as a vector. A matrix may be used to represent multi-dimensional features of a segment where each column of the matrix represents a multi-dimensional feature of one frame. If the dimension of the matrix of the segment were 64×10, it would mean that there would be 10 frames in the segment, and there is a 64-D vector for each frame. If the dimension of the matrix of the segment were 64×64, it would mean that there would be 64 frames in the segment, and there would be a 64-D vector for each frame.

The data preparation mechanism 102 may perform normalization on the sequence of multi-dimensional features to obtain a sequence of normalized frame-level features 112. The normalization may be a mean-variance normalization. That is, each of the sequence of multi-dimensional features may be normalized to zero mean and unit variance. The data preparation mechanism 102 may provide the sequence of normalized frame-level features 112 to the segment-level embedding extraction mechanism 104.

The segment-level embedding extraction mechanism 104 may generate a sequence of segment-level embeddings/representations 114 based on the sequence of normalized frame-level features 112. Embedding/representation may be considered as a vector in which desired information is encoded. For example, in speaker recognition including speaker identification and verification, embedding/representation may refer to a vector in which speaker information is encoded. For example, the segment-level embedding/representation 114 may encode the speaker information within a segment which includes a predetermined number of frames, such as 10 frames, 64 frames, and the like. For example, the input of the segment-level embedding extraction mechanism 104 may be a 64×10 matrix, and the output of the segment-level embedding extraction mechanism 104 may be a 64×8 matrix, which may be viewed as a 512-dimensional (512-D) vector. For another example, the input of the segment-level embedding extraction mechanism 104 may be a 64×64 matrix, and the output of the segment-level embedding extraction mechanism 104 may be a 512×1 matrix, which may be viewed as a 512-D vector. Numbers used here are for the sake of description rather than limiting the invention thereto. The segment-level embedding extraction mechanism 104 may provide the sequence of segment-level embeddings/representations 114 to the utterance-level embedding extraction mechanism 106.

The segment-level embedding extraction mechanism 104 is designed as an open framework which may incorporate any suitable adaptive/learning mechanisms such as CNN, recurrent neural network (RNN) including long short-term memory (LSTM) RNN or Gated Recurrent Unit (GRU) RNN, deep/shallow multilayer perceptron (MLP), any combination thereof, and the like. Modern designs or improvements of artificial neural networks may also be incorporated into the segment-level embedding extraction mechanism 104.

The utterance-level embedding extraction mechanism 106 may generate the utterance-level embedding/representation 116 based on the sequence of segment-level embeddings/representations 114. For example, the input of the utterance-level embedding extraction mechanism 106 may be a sequence of 512-D vectors. The utterance-level embedding extraction mechanism 106 may encode the sequence of 512-D vectors into an utterance-level embedding/representation 116 which is a 512-D vector. As a result, the utterance-level embedding/representation 116 may contain the speaker information of the whole utterance/sentence.

The utterance-level embedding extraction mechanism 106 is designed as an open framework which may incorporate any suitable adaptive/learning mechanisms such as CNN, RNN, LSTM RNN, GRU RNN, MLP, any combination thereof, and the like. Other suitable techniques may be used to reduce the number of parameters of the utterance-level embedding extraction mechanism 106 while maintaining similar performance. Modern designs or improvements of artificial neural networks may also be incorporated into the utterance-level embedding extraction mechanism 106.

Additionally, or alternatively, a batch normalization mechanism (not shown) may be added to normalize the sequence of segment-level embeddings/representations 114 across the time dimension. In that case, the sequence segment-level embeddings/representations 114 input to the utterance-level embedding extraction mechanism 106 has been normalized.

The system 100 may be trained with any suitable algorisms/methods. For example, the cross-entropy loss may be used to train the system 100. The segment-level embedding extraction mechanism 104 and the utterance-level embedding extraction mechanism 106 may be trained jointly or separately. Additionally, or alternatively, triplet loss may be introduced to re-train the trained system 100, without modifications to the system structure.

After training, the system 100 may be used for various tasks such as speaker identification and verification and the like. For example, an audio signal 110, which includes speeches from one or more speakers with noise interference, may be input to the system 100. The system 100 may extract the speaker's embedded utterance/sentence in a hierarchy way, namely, from frame-level features 112 to segment-level embeddings/representations 114, and to utterance-level embedding/representation 116. The utterance-level embedding extraction mechanism 106 may feed the utterance-level embedding/representation 116 to the classification/recognition mechanism 108. The classification/recognition mechanism 108 may recognize one or more speakers from the audio signal 108 based on the utterance-level representation by classifying the utterance-level embedding/representation 116 to a class associated with an Identification (ID) of the speaker. That is, the classification/recognition mechanism 108 may make a judgment indicating which speaker the audio/speech signal 110 belongs to.

The classification/recognition mechanism 108 is designed as an open framework which may incorporate any suitable types of classifier which are capable of handling multi-classes. For example, Artificial Neural Networks (ANN), Support Vector Machines (SVM), Naive Bayes classifiers, any combination thereof, and the like may be incorporated into the classification/recognition mechanism 108.

The classification/recognition mechanism 108 may include a linear layer and a Softmax layer (not shown). The Softmax function is often used in the final layer of a neural network-based classifier. Such networks are commonly trained under a log loss (or cross-entropy) regime, giving a non-linear variant of multinomial logistic regression. The output of the Softmax function can be used to represent a categorical distribution, that is, a probability distribution over a number of different possible outcomes. The utterance-level embedding extraction mechanism 106 may feed the utterance-level embedding/representation 116 to the linear layer and the Softmax layer. The linear layer may map the utterance-level embedding/representation 116 into a predetermined dimensional vector. For example, if the number of speakers were 1251, the linear layer would map the 512-D vector to a 1251-D vector. After passing the Softmax layer, each element of the 1251-D vector may have a value corresponding to a probability associated with a class. The element with the maximum value may be selected to determine to which class the input audio signal belongs. Each class may be associated with an ID of a speaker. As an example, if the $R^{th}$ element of the 1251-D vector were the maximum value, the input utterance/sentence would be determined as belonging to the $R^{th}$ class, which may correspond an ID of the $R^{th}$ speaker, where $1 \leq R \leq 1251$. That is, the input utterance/sentence belongs to the $R^{th}$ speaker. Numbers and symbols discussed herein are uses for the sake of description without limiting the application thereto.

The robustness of system 100 may be achieved by training with real-world data, where different speakers may speak in various environments with noise interference. For example, the code of the training may be based on any suitable algorithms/methods, such as open source deep learning framework and the like. The training data may be a public dataset from openly accessible resource, such as online audio/video materials. During the classification stage, the embedding/representation vector data may be trained using information relating to known patterns. The performances of the classification mechanism may be evaluated based on recognition accuracy.

Additionally, or alternatively, a voice activity detection (VAD) mechanism (not shown) may be added into the system 100. As an example, the VAD mechanism may be arranged prior to the data preparation mechanism 102 and used to remove silent parts of the audio/speech signal 110.

For an audio/speech signal with little silence, it is not necessary to add the VAD mechanism. However, for an audio/speech signal recorded in the real-world environment, the VAD mechanism may be useful. As another example, the VAD mechanism may be incorporated into the data preparation mechanism 102 and used to remove frames that represent silent parts.

The system 100 combines characteristics of segment-level embedding extraction mechanism 104 and the utterance-level embedding extraction mechanism 106. The system 100 uses the segment-level embedding extraction mechanism 104 to obtain good robustness of time-frequency features and obtain robustness against unfavorable acoustic environment such as noise. Meanwhile, the system 100 also uses the utterance-level embedding extraction mechanism 106 to model the time series and nonlinearly combine the sequence of segment-level embeddings/representations 114 of an utterance/sentence to achieve better recognition performance. On the other hand, the use of utterance-level embedding extraction mechanism 106 allows the system 100 to handle audio/speech signals with variable lengths without additionally design or additional processing.

FIG. 2 illustrates a table 200 of an example configuration of CNN.

As an example, the segment-level embedding extraction mechanism 104 may be implemented as a CNN. The configuration of the CNN at least partly depends on the dimension of the matrix input to the CNN. For example, the length of segment of the audio/speech signal is 10-frame, and the dimension of the matrix input to the CNN is 64×10. The CNN may take in the 64×10 matrix (frame-level features) and output a 512-D vector (segment-level embedding/representation).

Referring to FIG. 2, the CNN may include a first convolution layer (Conv1), a first max pooling layer (Maxpool1), a second convolution layer (Conv2), a second max pooling layer (Maxpool1), and a third convolution layer (Conv3). For each layer, parameters such as kernel size, stride, padding, number of filters, and data size are given, where the data size represents a dimension of vector output by a layer after the processing of the layer.

For the first convolution layer (Conv1), the kernel size may be 3×3, the stride may be (1,1), the padding may be 1, the number of filters may be 256, and the data size may be 128×64×10.

For the first max pooling layer (Maxpool1), the kernel size may be 2×2, the stride may be (2,2), the padding may be 0, and the data size may be 128×32×5.

For the second convolution layer (Conv2), the kernel size may be 3×3, the stride may be (2,2), the padding may be 1, the number of filters may be 256, and the data size may be 256×16×3.

For the second max pooling layer (Maxpool1), the kernel size may be 2×3, the stride may be (2,1), the padding may be 0, and the data size may be (256×8×1).

For the third convolution layer (Conv3), the kernel size may be 1×1, the stride may be (1,1), the padding may be 0, the number of filters may be 64, and the data size may be 64×8×1. The vector with the size of 64×8×1 may be deemed as a 512-D vector. The third convolution layer (Conv3) is designed for dimensionality reduction to achieve a 512-D segment-level embedding/representation, which is a vector with 512 elements/components.

Additionally, or alternatively, after the first and second convolution layers Conv1 and Conv2, a batch normalization (not shown) may be added. An activation function thereof may be a Rectified Linear Unit (ReLU). Batch normalization is a technique for improving the performance and stability of artificial neural networks. Batch normalization may be used to normalize the input layer by adjusting and scaling the activations.

Figure 3:
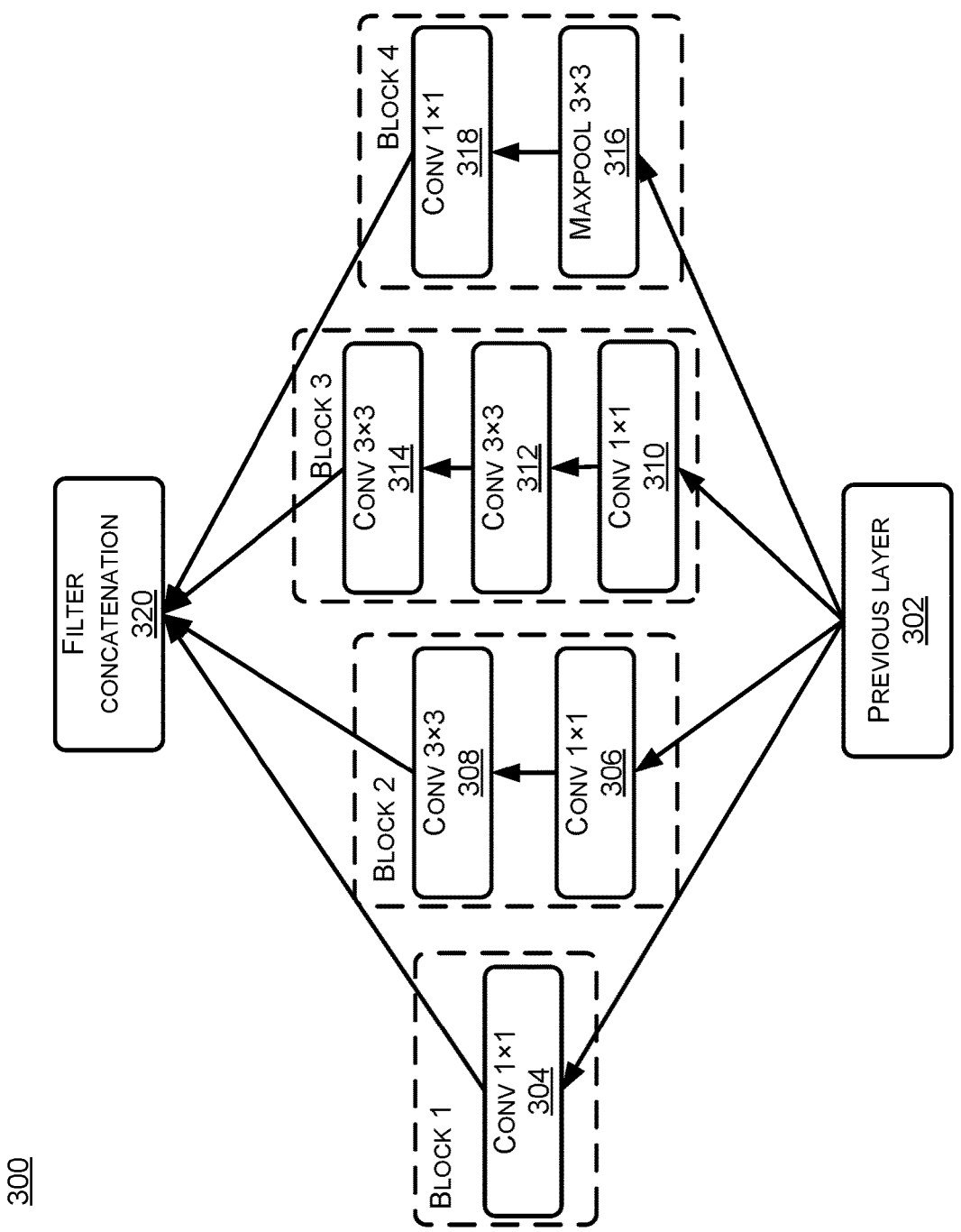
FIG. 3 illustrates an example block diagram of an inception block-based CNN.

FIG. 3 illustrates an example block diagram of an inception block-based CNN 300.

As an example, the segment-level embedding extraction mechanism 104 may be implemented to be the inception block-based CNN 300. If the length of segment of the audio/speech signal were 64-frame, the dimension of the matrix input to the inception block-based CNN 300 would be 64×64. The inception block-based CNN 300 may take in the 64×64 matrix (frame-level features) and output a 512-D vector (segment-level embedding/representation).

Referring to FIG. 3, a previous layer 302 may be coupled to Block 1, Block 2, Block 3, and Block 4. Block 1 may include the first kernel 304 (Conv1×1). Block 2 may include the second kernel 306 (Conv1×1) and the third kernel 308 (Conv3×3). Block 3 may include the fourth kernel 310 (Conv1×1), the fifth kernel 312 (Conv3×3), and the sixth kernel 314 (Conv3×3). Block 4 may include the seventh kernel 316 (Maxpool3×3) and the eighth kernel 318 (Conv1×1). Block 1, Block 2, Block 3, and Block 4 may be coupled to a filter concatenation module 320.

In the inception block-based CNN 300, kernels with different sizes are deployed in the same layer, making the inception block-based CNN 300 wider instead of deeper.

FIG. 4 illustrates a table 400 of an example configuration of the inception block-based CNN 300. A set of hyper-parameters of the inception block-based CNN 300 may be determined as shown in FIG. 4.

Referring to FIG. 4, for the first kernel (Conv1×1) 304 of Block 1, the kernel size may be 1×1, the stride may be 2, the padding may be 0, the number of filters (in) may be N, the number of filters (out) may be M.

For the second kernel (Conv1×1) 306 of Block 2, the kernel size may be 1×1, the stride may be 1, the padding may be 0, the number of filters (in) may be N, the number of filters (out) may be M/2.

For the third kernel (Conv3×3) 308 of Block 2, the kernel size may be 3×3, the stride may be 2, the padding may be 1, the number of filters (in) may be M/2, the number of filters (out) may be M.

For the fourth kernel (Conv1×1) 310 of Block 3, the kernel size may be 1×1, the stride may be 1, the padding may be 0, the number of filters (in) may be N, the number of filters (out) may be M/2.

For the fifth kernel (Conv3×3) 312 of Block 3, the kernel size may be 3×3, the stride may be 1, the padding may be 1, the number of filters (in) may be M/2, the number of filters (out) may be M.

For the sixth kernel (Conv3×3) 314 of Block 3, the kernel size may be 3×3, the stride may be 2, the padding may be 1, the number of filters (in) may be M, the number of filters (out) may be M.

For the seventh kernel (Maxpool3×3) 316 of Block 4, the kernel size may be 3×3, the stride may be 2, the padding may be 1, the number of filters (in) may be N, the number of filters (out) may be N.

For the eighth kernel (Conv1×1) 318 Block 4, the kernel size may be 1×1, the stride may be 1, the padding may be 0, the number of filters (in) may be N, the number of filters (out) may be M.

Each block (Block 1, Block 2, Block 3, and Block 4) may be considered as a layer with different kernels. For different layers, N and M are different numbers, and the details are presented in FIG. 5.

FIG. 5 illustrates a table 500 of parameters of layers/blocks of the inception block-based CNN 300.

Referring to FIG. 5, for Block 1, N may be 1, M may be 64, and the data size may be 256×32×32. For Block 2, N may be 256, M may be 64, and the data size may be 256×16×16. For Block 3, N may be 256, M may be 128, and the data size may be 512×8×8. For Block 4, N may be 512, M may be 128, and the data size may be 512×4×4. For the MaxPool layer (4×4), the data size may be 512×1×1.

Figure 6:
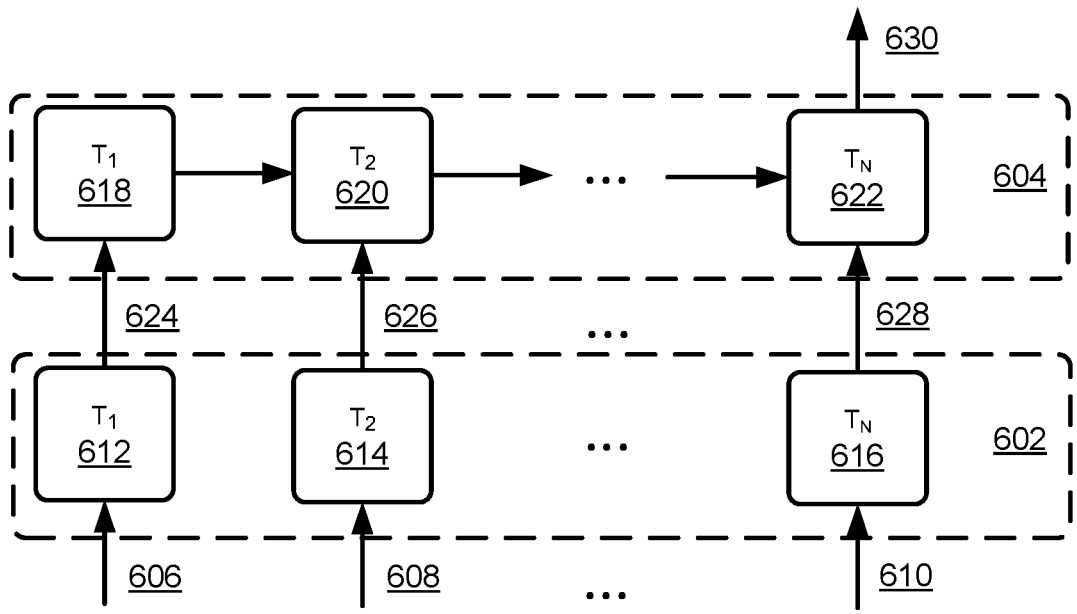
FIG. 6 illustrates an example block diagram of a system for audio signal processing unfolded in a time-expanded manner.

FIG. 6 illustrates an example block diagram of a system 600 for audio signal processing unfolded in a time-expanded manner.

The system 600 may include a segment-level embedding extraction mechanism 602 and an utterance-level embedding extraction mechanism 604 that may be unfolded according to a series of time steps. For example, a sequence of frame-level features 606, 608, . . . , and 610 may be used as the input of the segment-level embedding extraction mechanism 602. If the number of frame-level features in the sequence were n, where n is a positive integer, the segment-level embedding extraction mechanism 602 and the utterance-level embedding extraction mechanism 604 would be unfolded according to n time steps, i.e., $t_1$, $t_2$, . . . , and $t_n$.

The sequence of frame-level features 606, 608, . . . , and 610 may be used as the input of the unfolded segment-level embedding extraction mechanisms at $t_1$ 612, $t_2$ 614, . . . , and $t_n$ 616, respectively. The unfolded segment-level embedding extraction mechanisms at $t_1$ 612, $t_2$ 614, . . . , and $t_n$ 616 may output a sequence of segment-level embeddings/representations 624, 626, . . . , and 628, respectively. The sequence of segment-level embeddings/representations 624, 626, . . . , and 628 may be used as the input of the unfolded utterance-level embedding extraction mechanisms at $t_1$ 618, $t_2$ 620, . . . , and $t_n$ 622, respectively. The unfolded utterance-level embedding extraction mechanisms at $t_1$ 618, $t_2$ 620, . . . , and $t_n$ 622 may encode the sequence of segment-level embeddings/representations 624, 626, . . . , and 628, respectively to obtain an utterance-level embedding/representation 630, which may be in the form of a vector.

As an example, the system 600 may implement a CNN as the segment-level embedding extraction mechanism 602, and an RNN as the utterance-level embedding extraction mechanism 604.

Additionally, or alternatively, LSTM RNN or GRU RNN may be implemented as the utterance-level embedding extraction mechanism 604 to avoid the gradient exploding or vanishing issue of the RNN. Moreover, a GRU RNN may reduce the number of model parameters. For example, an LSTM RNN is defined by the following formulas (1)-(6).

$$i_t = \text{sigmoid}(W_{ii}x_t + W_{hi}h_{t-1} + b_i) \quad (1)$$

$$f_t = \text{sigmoid}(W_{if}x_t + W_{hf}h_{t-1} + b_f) \quad (2)$$

$$g_t = \tanh(W_{ig}x_t + W_{hg}h_{t-1} + b_g) \quad (3)$$

$$o_t = \text{sigmoid}(W_{io}x_t + W_{ho}h_{t-1} + b_o) \quad (4)$$

$$c_t = f_t \circ c_{t-1} + i_t \circ g_t \quad (5)$$

$$h_t = o_t \circ \tanh(c_t) \quad (6)$$

In the above formulas (1)-(6), $i_t$, $f_t$, $g_t$, $o_t$ are the input, forget, cell, and output gates, respectively; at a time step t, $h_t$ is the hidden state; $c_t$ is the memory cell state; $x_t$ is the input of the first layer or the hidden state of the previous layer; $W_{ii}$, $W_{hi}$, $W_{if}$, $W_{hf}$, $W_{ig}$, $W_{hg}$, $W_{io}$, and $W_{ho}$ denote weights in the linear transformations, respectively; $b_i$, $b_f$, $b_g$, and $b_o$, denote biases in the linear transformations, respectively; and ○ denotes the element-wise multiplication.

Sigmoid function is defined by the following formula (7).

$$\text{sigmoid}(x) = \frac{1}{1+e^{-x}} \quad (7)$$

Tan h function is defined by the following formula (8).

$$\tanh(x) = \frac{e^x - e^{-x}}{e^x + e^{-x}} \quad (8)$$

In the example LSTM RNN, the number of hidden layer units may be 512. The output of the LSTM RNN may be a 512-D vector. The LSTM RNN may be unfolded according to a series of time steps in the same manner as the utterance-level embedding extraction mechanism 604 described above with reference to FIG. 6. A hidden state obtained at the last time step $t_n$ by the LSTM RNN may be used as the output utterance-level embedding/representation 630. In other words, the LSTM RNN is used to encode the sequence of segment-level embeddings/representations 606, 608, . . . , and 610 into the hidden state of the last time step.

It should be noted that in FIG. 6, the system 600 is unfolded in a time-expanded manner for convenience of illustration. In fact, the unfolded segment-level embedding extraction mechanisms at $t_1$ 612, $t_2$ 614, . . . , and $t_n$ 616 share the same parameters, and the unfolded utterance-level embedding extraction mechanisms at $t_1$ 618, $t_2$ 620, . . . , and $t_n$ 622 share the same parameters.

Figure 7:
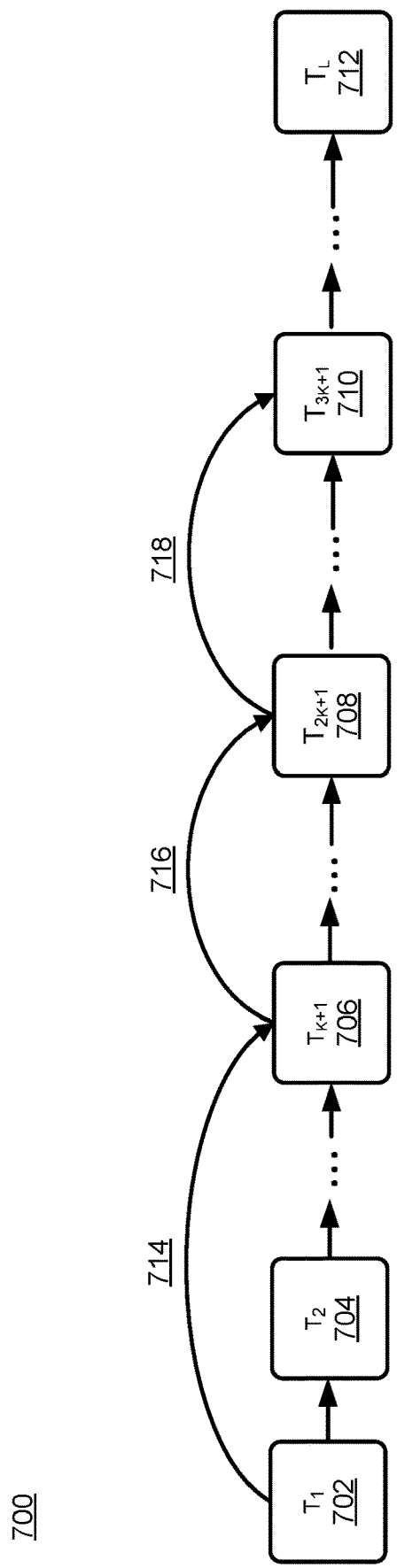
FIG. 7 illustrates an example block diagram of an utterance-level embedding extraction mechanism with skip connections.

FIG. 7 illustrates an example block diagram of an utterance-level embedding extraction mechanism 700 with skip connections.

For a relatively long audio/speech signal, or for a relatively small segment size, a relatively long sequence of segments may be obtained. Considering the problem of gradient vanishing, the utterance-level embedding extraction mechanism 700 may have limited modeling capabilities. Therefore, one or more jump/skip connections may be added in the time direction of the utterance-level embedding extraction mechanism 700 to facilitate the information transfer in the time direction. By adding jump/skip connections, the long time ago information may be incorporated into subsequent steps. In other words, the jump/skip connections may be used to directly pass the information from several time steps ago to the follow-up steps. Thus, a resulting utterance-level embedding/representation may better balance the information of the entire sequence of segments of the utterance/sentence.

Referring to FIG. 7, the utterance-level embedding extraction mechanism 700 may be unfolded according to a series of time steps $t_1$, $t_2$, . . . , $t_{K+1}$, $t_{2K+1}$, . . . , $t_{3K+1}$, and $t_L$, where K and L are positive integers. At each time step, the unfolded utterance-level embedding extraction mechanism 700 may have a hidden state 702, 704, 706, 708, 710, or 712. For example, a jump/skip connection may be added every K steps. Jump/skip connection 714 may be added between hidden states at $t_1$ 702 and $t_{K+1}$ 706. Jump/skip connection 716 may be added between hidden states at $t_{K+1}$ 706 and $t_{2K+1}$ 708. Jump/skip connection 718 may be added between hidden states at $t_{2K+1}$ 708 and $t_{3K+1}$ 710. The jump/skip size is a hyperparameter which may be adjusted as necessary.

As an example, an LSTM RNN may be implemented as the utterance-level embedding extraction mechanism 700. The LSTM RNN may be defined by the following formulas (9)-(15).

$$i_t = \text{sigmoid}(W_{ii}x_t + W_{hi}h_{t-1} + b_i) \quad (9)$$

$$f_t = \text{sigmoid}(W_{if}x_t + W_{hf}h_{t-1} + b_f) \quad (10)$$

$$g_t = \tan h(W_{ig}x_t + W_{hg}h_{t-1} + b_g) \quad (11)$$

$$o_t = \text{sigmoid}(W_{io}x_t + W_{ho}h_{t-1} + b_o) \quad (12)$$

$$c_t = f_t \circ c_{t-1} + i_t \circ g_t \quad (13)$$

$$h_t = o_t \circ \tan h(c_t) \quad (14)$$

$$h_{t+K} = o_{t+K} \circ \tan h(c_{t+K}) + \alpha h_t \quad (15)$$

In the above formulas (9)-(15), the same parameters have the same meanings as those in formulas (1)-(6) as described above.

Formula (15) indicates that one or more jump/skip connections are added. A scalar parameter α is an additional trainable parameter and its initial value may be set to be 1. K denotes the number of steps to jump/skip.

Figure 8:
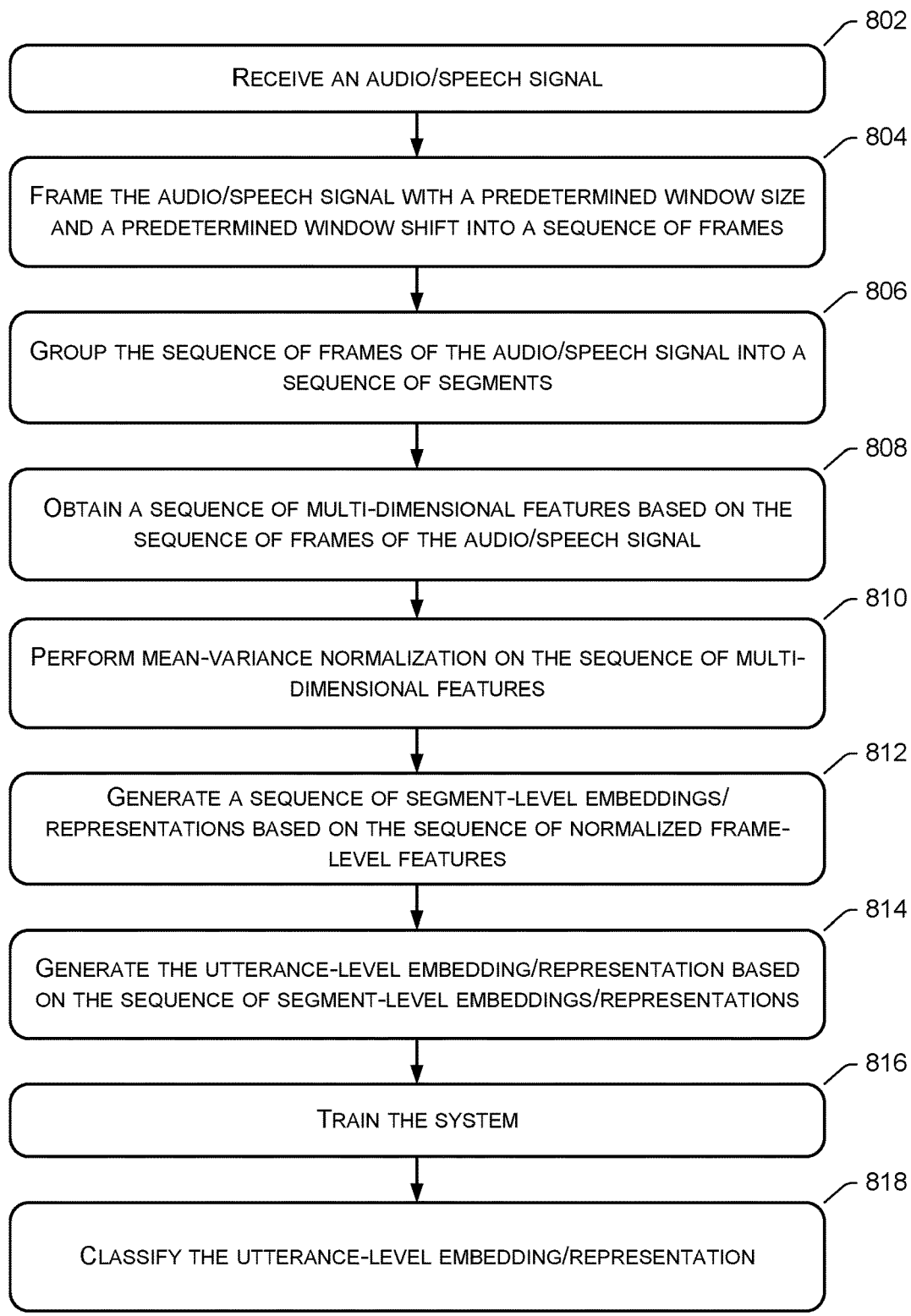
FIG. 8 illustrates an example flowchart of a process for audio signal processing.

FIG. 8 illustrates an example flowchart of a process 800 for audio signal processing. Hereinafter, the process 800 is described through four stages, i.e., data preparation, segment-level embedding extraction, utterance-level embedding extraction, and training.

Data Preparation

At block 802, the data preparation mechanism 102 may receive an audio/speech signal 110, in the same manner as discussed above with reference to FIG. 1.

At block 804, the data preparation mechanism 102 may frame the audio/speech signal 110 with a predetermined window size and a predetermined window shift to obtain a sequence of frames, in the same manner as discussed above with reference to FIG. 1.

At block 806, the data preparation mechanism 102 may group the sequence of frames of the audio/speech signal 110 into a sequence of segments, in the same manner as discussed above with reference to FIG. 1.

At block 808, the data preparation mechanism 102 may obtain a sequence of multi-dimensional features based on the sequence of frames of the audio/speech signal 110, in the same manner as discussed above with reference to FIG. 1.

At block 810, the data preparation mechanism 102 may normalize the sequence of multi-dimensional features to obtain a sequence of normalized frame-level features 112, in the same manner as discussed above with reference to FIG. 1.

Segment-Level Embedding Extraction

At block 812, the segment-level embedding extraction mechanism 104 may generate a sequence of segment-level embeddings/representations 114 based on the sequence of normalized frame-level features 112, in the same manner as discussed above with reference to FIG. 1.

Utterance-Level Embedding Extraction

At block 814, the utterance-level embedding extraction mechanism 106 may generate the utterance-level embedding/representation 116 based on the sequence of segment-level embeddings/representations 114, in the same manner as discussed above with reference to FIG. 1.

Training

At block 816, the system 100 may be trained, in the same manner as discussed above with reference to FIG. 1.

At block 818, the classification/recognition mechanism 108 may recognize one or more speakers from the audio signal 108 based on the utterance-level representation, in the same manner as discussed above with reference to FIG. 1.

Systems and processes discussed herein may be used in voice interactive products and audio-based identity tags. In a real environment, because of environmental noise, background voice, equipment noise, room reverberation, etc., the performance of the speaker recognition/verification system in the harsh acoustic environment may significantly degrade. Systems and processes discussed herein may obtain a more robust embedding/representation of various interference factors by means of deep learning and a large amount of speech training data, improving the performance of the speaker recognition/verification in an actual scene.

Figure 9:
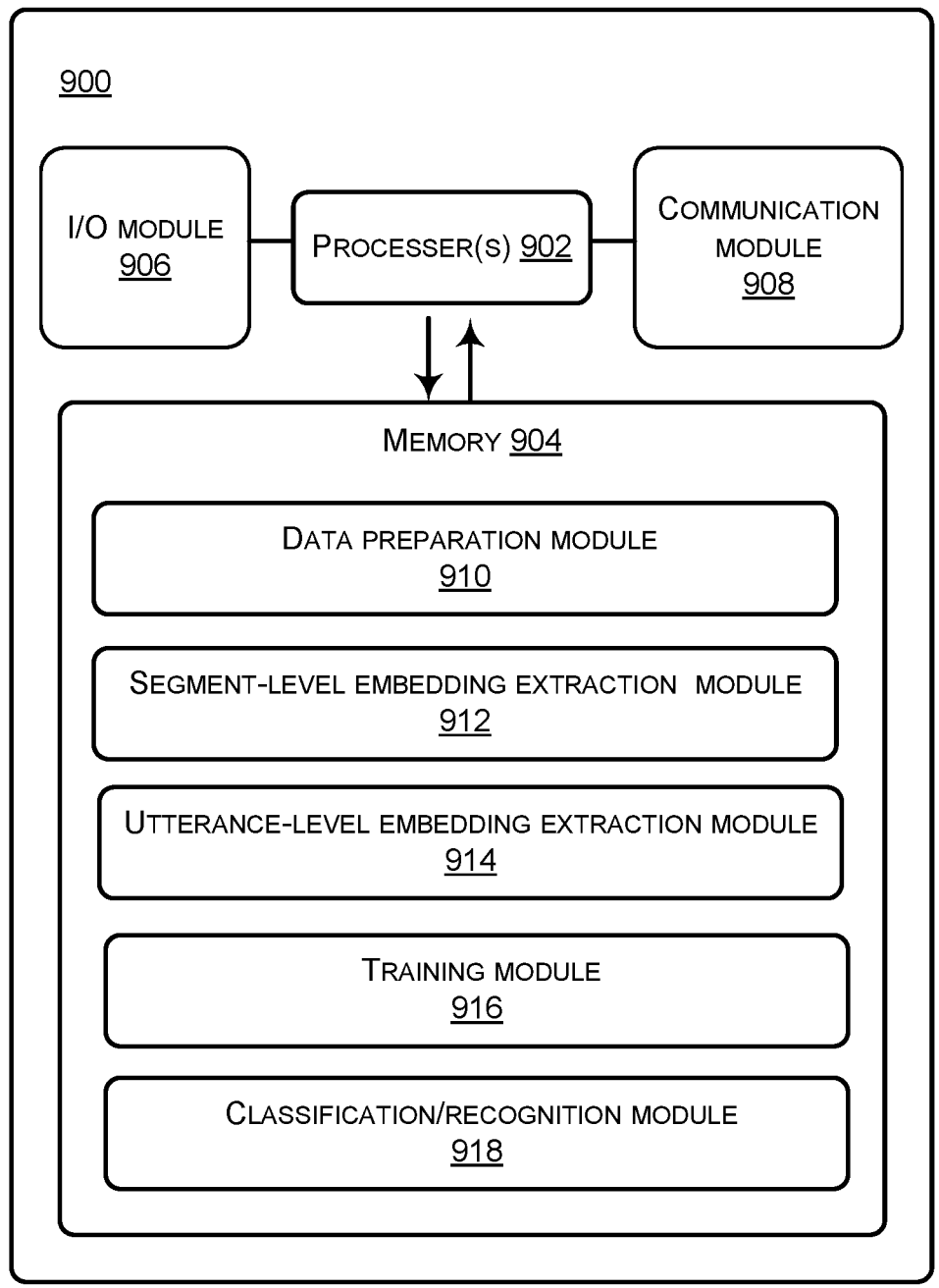
FIG. 9 illustrates an example system 900 for audio signal processing.

FIG. 9 illustrates an example system 900 for audio signal processing.

The techniques and mechanisms described herein may be implemented by multiple instances of the system 900 as well as by any other computing device, system, and/or environment. The system 900 shown in FIG. 9 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 900 may include one or more processor(s) 902 and memory 904 communicatively coupled to the processor(s) 902. The processor(s) 902 may execute one or more modules and/or processes to cause the processor(s) 902 to perform a variety of functions. In some embodiments, the processor(s) 902 may include a central processing unit (CPU), a graphics processing unit (GPU), both CPU and GPU, or other processing units or components known in the art. Additionally, each of the processor(s) 902 may possess its own local memory, which also may store program modules, program data, and/or one or more operating systems.

Depending on the exact configuration and type of the system 900, the system memory 904 may be volatile, such as RAM, non-volatile, such as ROM, flash memory, miniature hard drive, memory card, and the like, or some combination thereof. The memory 904 may include one or more computer-executable modules (modules) that are executable by the processor(s) 902. The system 900 may additionally include an input/output (I/O) interface 906 for receiving data to be processed and outputting the processed data. The system 900 may also include a communication module 908 allowing the system 900 to communicate with other devices (not shown) over a network (not shown). The network may include the Internet, wired media such as a wired network or direct-wired connections, and wireless media such as acoustic, radio frequency (RF), infrared, and other wireless media.

The modules stored on the memory 904 may include, but are not limited to, a data preparation module 910, a segment-level embedding extraction module 912, an utterance-level embedding extraction module 914, a training module 916, and a classification/recognition module 918.

The data preparation module 910 may be configured to receive an audio/speech signal, frame the audio/speech signal 110 with a predetermined window size and a predetermined window shift into a sequence of frames, and group the sequence of frames of the audio/speech signal 110 into a sequence of segments. The data preparation module 910 may be further configured to obtain a sequence of multi-dimensional features based on the sequence of frames of the audio/speech signal 110 and perform normalization on the sequence of multi-dimensional features to obtain a sequence of normalized frame-level features 112, in the same manner as discussed above with reference to FIG. 1.

The segment-level embedding extraction module 912 may be configured to generate a sequence of segment-level embeddings/representations 114 based on the sequence of normalized frame-level features 112, in the same manner as discussed above with reference to FIG. 1.

The utterance-level embedding extraction module 914 may be configured to generate the utterance-level embedding/representation 116 based on the sequence of segment-level embeddings/representations 114, in the same manner as discussed above with reference to FIG. 1.

The training module 916 may be configured to train the segment-level embedding extraction module 912 and the utterance-level embedding extraction module 914 jointly or separately, in the same manner as discussed above with reference to FIG. 1.

The classification/recognition module 918 may be configured to make a judgment indicating which speaker the audio/speech signal 110 belongs to, in the same manner as discussed above with reference to FIG. 1.

Systems and processes discussed herein may be deemed as an open framework, into which the latest techniques may be integrated by adding and/or replacing corresponding mechanisms/modules. Systems and processes discussed herein can handle the audio/speech signals with variable lengths so that the output of the system is a speaker embedding/representation of a complete utterance/sentence, which may be used for speaker recognition/verification. Systems and processes discussed herein may have a relatively small number of parameters, for example, a little bit more than 3M, saving computing and storage resources. Good recognition results may be achieved with fewer parameters. Systems and processes discussed herein may address text-independent speaker recognition/verification tasks.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-9. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

Clause 1. A method comprising: receiving an audio signal; obtaining a plurality of multi-dimensional features based on the audio signal; obtaining a plurality of segment-level representations based on the plurality of multi-dimensional features; obtaining an utterance-level representation based on the plurality of segment-level representations; and recognizing a speaker from the audio signal based on the utterance-level representation.

Clause 2. The method of clause 1, wherein the audio signal includes speeches from a plurality of speakers with noise interference.

Clause 3. The method of clause 1, wherein after receiving the audio signal, the method further comprises: dividing the audio signal into a plurality of frames using a predetermined window size and a predetermined window shift; and grouping the plurality of frames into a plurality of segments, a respective segment of the plurality of segments including a predetermined number of frames.

Clause 4. The method of clause 1, wherein after obtaining the plurality of multi-dimensional features based on the audio signal, the method further comprises normalizing the plurality of multi-dimensional features.

Clause 5. The method of clause 2, wherein obtaining the plurality of multi-dimensional features based on the audio signal includes converting the plurality of frames into a plurality of multi-dimensional filter bank features.

Clause 6. The method of clause 1, wherein obtaining the plurality of segment-level representations based on the plurality of multi-dimensional features is performed by a Convolutional Neural Network (CNN).

Clause 7. The method of clause 1, wherein obtaining the utterance-level representation based on the plurality of segment-level representations is performed by a Recurrent Neural Network (RNN).

Clause 8. The method of clause 1, wherein recognizing the speaker from the audio signal based on the utterance-level representation includes classifying the utterance-level representation into a class associated with an Identification (ID) of the speaker.

Clause 9. A computer-readable storage medium storing computer-readable instructions executable by one or more processors, that when executed by the one or more processors, cause the one or more processors to perform operations comprising: obtaining a plurality of multi-dimensional features based on the audio signal; obtaining a plurality of segment-level representations based on the plurality of multi-dimensional features; obtaining an utterance-level representation based on the plurality of segment-level representations; and recognizing a speaker from the audio signal based on the utterance-level representation.

Clause 10. The computer-readable storage medium of clause 9, wherein the audio signal includes speeches from a plurality of speakers with noise interference.

Clause 11. The computer-readable storage medium of clause 9, wherein after receiving the audio signal, the operations further comprise: dividing the audio signal into a plurality of frames using a predetermined window size and a predetermined window shift; and grouping the plurality of frames into a plurality of segments, a respective segment of the plurality of segments including a predetermined number of frames.

Clause 12. The computer-readable storage medium of clause 9, wherein after obtaining the plurality of multi-dimensional features based on the audio signal, the operations further comprise normalizing the plurality of multi-dimensional features.

Clause 13. The computer-readable storage medium of clause 10, wherein obtaining the plurality of multi-dimensional features based on the audio signal includes converting the plurality of frames into a plurality of multi-dimensional filter bank features.

Clause 14. The computer-readable storage medium of clause 9, wherein obtaining the plurality of segment-level representations based on the plurality of multi-dimensional features is performed by a CNN.

Clause 15. The computer-readable storage medium of clause 9, wherein obtaining the utterance-level representation based on the plurality of segment-level representations is performed by an RNN.

Clause 16. The computer-readable storage medium of clause 9, wherein recognizing the speaker from the audio signal based on the utterance-level representation includes the operations further comprise classifying the utterance-level representation into a class associated with an ID of the speaker.

Clause 17. A system comprising: one or more processors; and memory communicatively coupled to the one or more processors, the memory storing computer-executable modules executable by the one or more processors, the computer-executable modules including: a data preparation module configured to receive an audio signal and obtain a plurality of multi-dimensional features based on the audio signal; a segment-level embedding extraction module configured to obtain a plurality of segment-level representations based on the plurality of multi-dimensional features; an utterance-level embedding extraction module configured to obtain an utterance-level representation based on the plurality of segment-level representations; and a classification module configured to recognize a speaker from the audio signal based on the utterance-level representation by classifying the utterance-level representation into a class associated with an ID of the speaker.

Clause 18. The system of clause 17, wherein the audio signal includes speeches from a plurality of speakers with noise interference.

Clause 19. The system of clause 17, wherein the data preparation module is further configured to: divide the audio signal into a plurality of frames using a predetermined window size and a predetermined window shift; group the plurality of frames into a plurality of segments, a respective segment of the plurality of segments including a predetermined number of frames; convert the plurality of frames into a plurality of multi-dimensional filter bank features; and normalizing the plurality of multi-dimensional filter bank features.

Clause 20. The system of clause 17, wherein the segment-level embedding extraction module includes a CNN, and the utterance-level embedding extraction module includes an RNN.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving an audio signal;
dividing the audio signal into a plurality of frames using a predetermined window size and a predetermined window shift; and
grouping the plurality of frames into a plurality of segments, a respective segment of the plurality of segments including a predetermined number of frames;
obtaining a plurality of multi-dimensional features based on the audio signal, wherein obtaining the plurality of multi-dimensional features based on the audio signal includes converting the plurality of frames into a plurality of multi-dimensional filter bank features;
normalizing the plurality of multi-dimensional filter bank features;
obtaining a plurality of segment-level representations based on the plurality of multi-dimensional features;
obtaining, by an utterance-level embedding extraction mechanism, an utterance-level representation based on the plurality of segment-level representations, wherein the utterance-level embedding extraction mechanism is unfolded according to a series of time steps, and one or more jump connections are added between two time steps of the series of time steps in a time direction of the utterance-level embedding extraction mechanism; and
recognizing a speaker from the audio signal based on the utterance-level representation.

2. The method of claim 1, wherein the audio signal includes speeches from a plurality of speakers with noise interference.

3. The method of claim 1, wherein obtaining the plurality of segment-level representations based on the plurality of multi-dimensional features is performed by a Convolutional Neural Network (CNN).

4. The method of claim 1, wherein the utterance-level embedding extraction mechanism includes a Recurrent Neural Network (RNN).

5. The method of claim 1, wherein recognizing the speaker from the audio signal based on the utterance-level representation includes classifying the utterance-level representation into a class associated with an Identification (ID) of the speaker.

6. A computer-readable storage medium storing computer-readable instructions executable by one or more processors, that when executed by the one or more processors, cause the one or more processors to perform operations comprising:
   receiving an audio signal;
   dividing the audio signal into a plurality of frames using a predetermined window size and a predetermined window shift; and
   grouping the plurality of frames into a plurality of segments, a respective segment of the plurality of segments including a predetermined number of frames;
   obtaining a plurality of multi-dimensional features based on the audio signal; wherein obtaining the plurality of multi-dimensional features based on the audio signal includes converting the plurality of frames into a plurality of multi-dimensional filter bank features;
   normalizing the plurality of multi-dimensional filter bank features;
   obtaining a plurality of segment-level representations based on the plurality of multi-dimensional features;
   obtaining, by an utterance-level embedding extraction mechanism, an utterance-level representation based on the plurality of segment-level representations, wherein the utterance-level embedding extraction mechanism is unfolded according to a series of time steps, and one or more jump connections are added between two time steps of the series of time steps in a time direction of the utterance-level embedding extraction mechanism; and
   recognizing a speaker from the audio signal based on the utterance-level representation.

7. The computer-readable storage medium of claim 6, wherein the audio signal includes speeches from a plurality of speakers with noise interference.

8. The computer-readable storage medium of claim 6, wherein obtaining the plurality of segment-level representations based on the plurality of multi-dimensional features is performed by a Convolutional Neural Network (CNN).

9. The computer-readable storage medium of claim 6, wherein the utterance-level embedding extraction mechanism includes a Recurrent Neural Network (RNN).

10. The computer-readable storage medium of claim 6, wherein recognizing the speaker from the audio signal based on the utterance-level representation includes the operations further comprise classifying the utterance-level representation into a class associated with an ID of the speaker.

11. A system comprising:
    one or more processors; and
    memory communicatively coupled to the one or more processors, the memory storing computer-executable modules executable by the one or more processors, the computer-executable modules including:
    a data preparation module configured to receive an audio signal and obtain a plurality of multi-dimensional features based on the audio signal, wherein the data preparation module is further configured to:
    divide the audio signal into a plurality of frames using a predetermined window size and a predetermined window shift;
    group the plurality of frames into a plurality of segments, a respective segment of the plurality of segments including a predetermined number of frames;
    convert the plurality of frames into a plurality of multi-dimensional filter bank features; and
    normalizing the plurality of multi-dimensional filter bank features;
    a segment-level embedding extraction module configured to obtain a plurality of segment-level representations based on the plurality of multi-dimensional features;
    an utterance-level embedding extraction module configured to obtain an utterance-level representation based on the plurality of segment-level representations, wherein the utterance-level embedding extraction module is configured to be unfolded according to a series of time steps, and one or more jump connections are added between two time steps of the series of time steps in a time direction of the utterance-level embedding extraction module; and
    a classification module configured to recognize a speaker from the audio signal based on the utterance-level representation by classifying the utterance-level representation into a class associated with an ID of the speaker.

12. The system of claim 11, wherein the audio signal includes speeches from a plurality of speakers with noise interference.

13. The system of claim 11, wherein the segment-level embedding extraction module includes a Convolutional Neural Network (CNN), and the utterance-level embedding extraction module includes a Recurrent Neural Network (RNN).

* * * * *